W. H. SAUVAGE.
SAFETY DEVICE FOR FLUID PRESSURE BRAKE SYSTEMS.
APPLICATION FILED SEPT. 28, 1910.
1,013,821.
Patented Jan. 2, 1912.
3 SHEETS—SHEET 3.
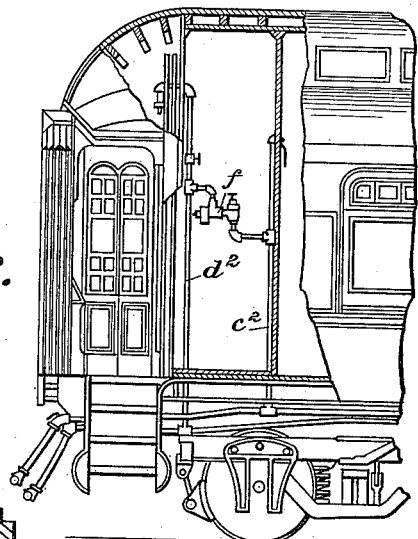
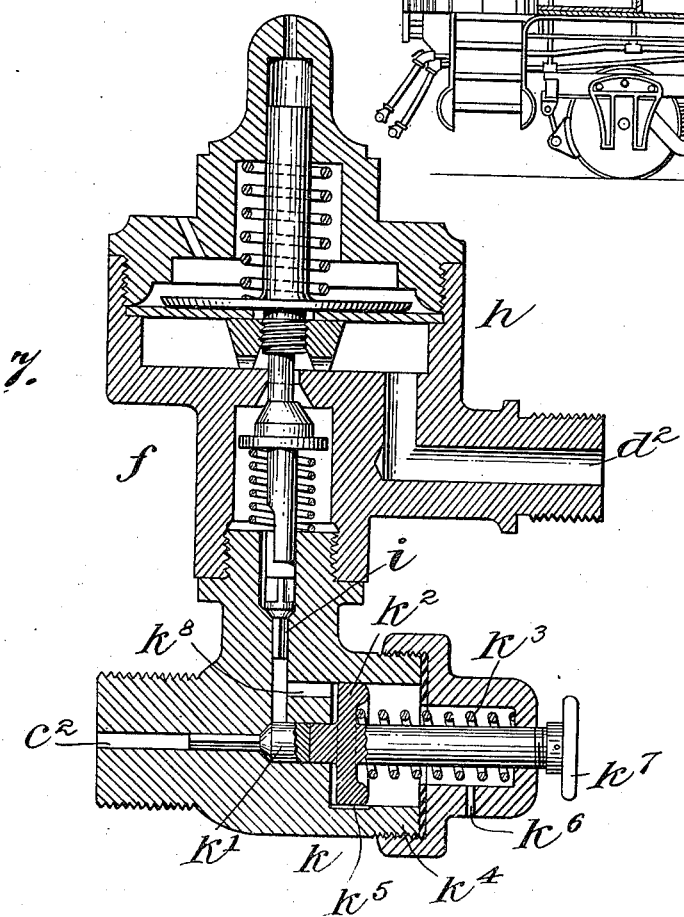
Attest:
Inventor:
William H. Sauvage
by Redding, Greeley & Austin
Attys.

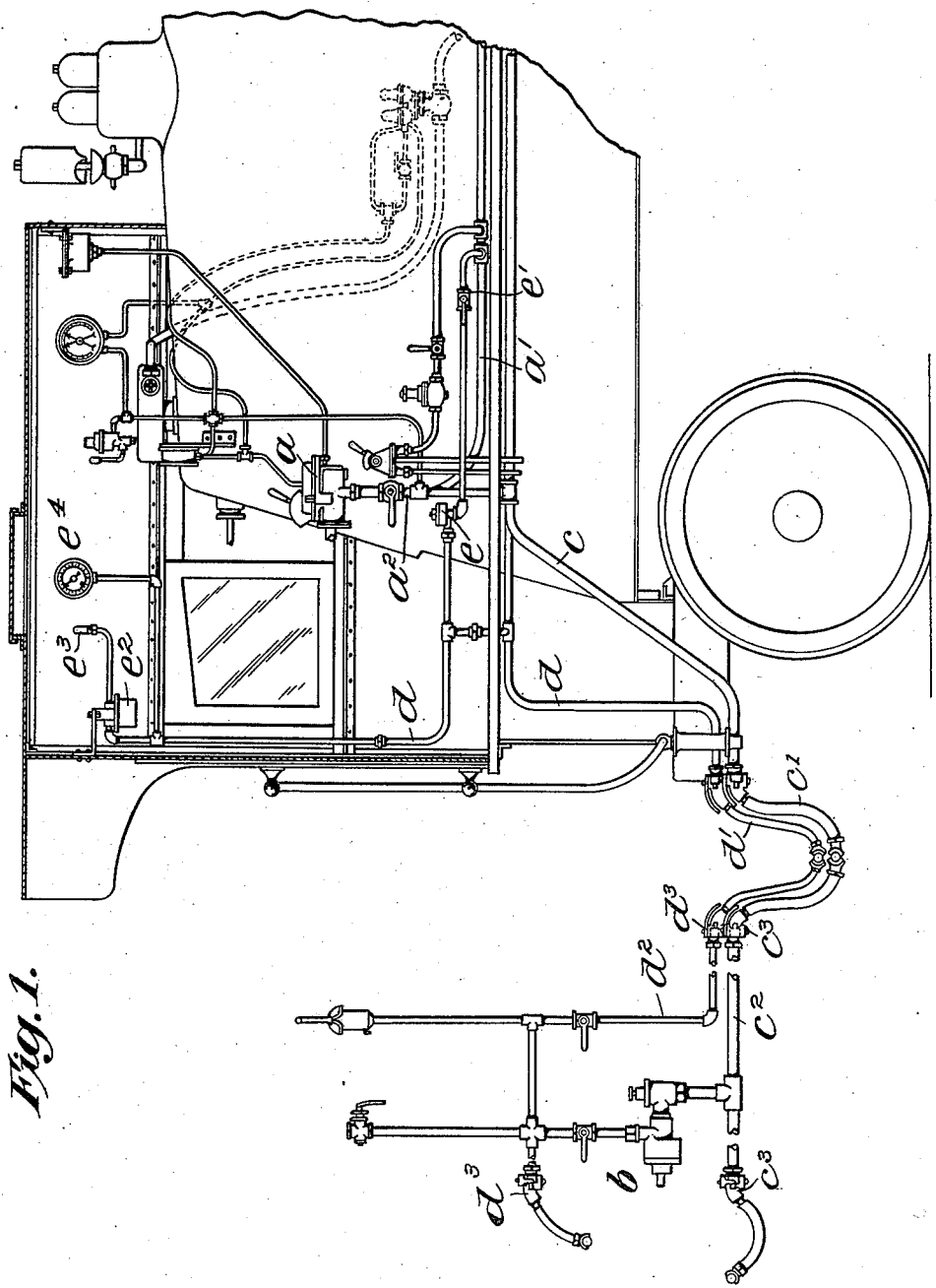

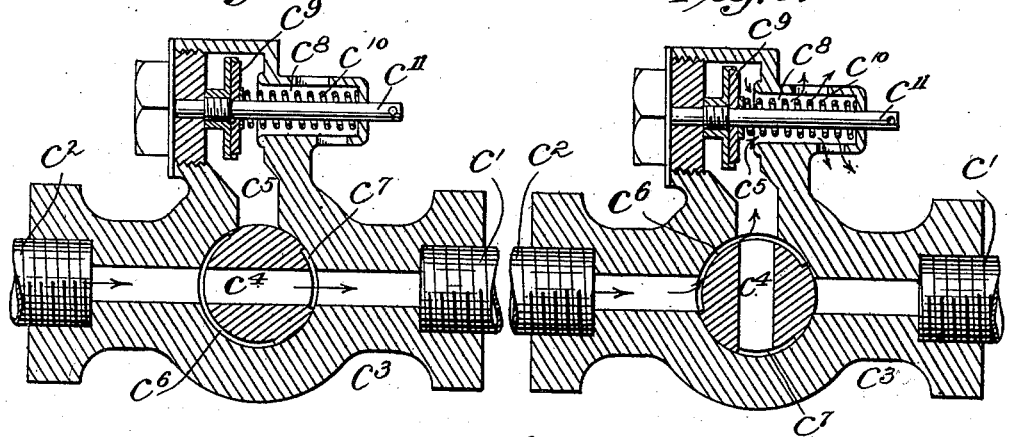
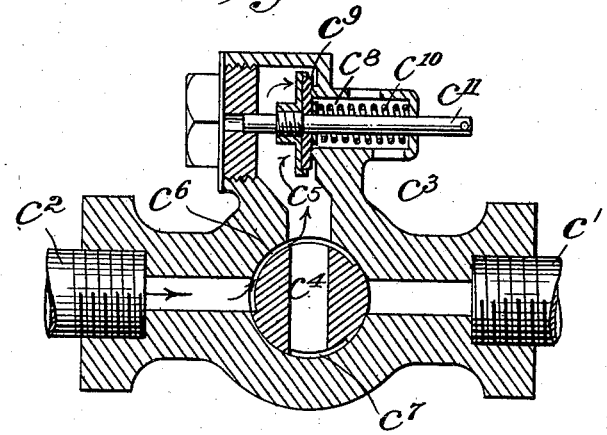
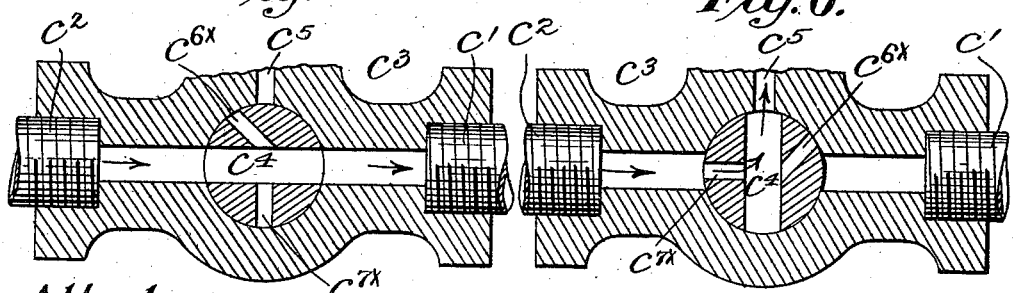

UNITED STATES PATENT OFFICE.

WILLIAM H. SAUVAGE, OF NEW YORK, N. Y., ASSIGNOR OF ONE-HALF TO VANCE S. MANSON, OF NEW YORK, N. Y.

SAFETY DEVICE FOR FLUID-PRESSURE BRAKE SYSTEMS.

1,013,821.  Specification of Letters Patent.  Patented Jan. 2, 1912.

Application filed September 28, 1910. Serial No. 584,231.

*To all whom it may concern:*

Be it known that I, WILLIAM H. SAUVAGE, a citizen of the United States, residing in the borough of Manhattan of the city of New York, in the State of New York, have invented certain new and useful Improvements in Safety Devices for Fluid-Pressure Brake Systems, of which the following is a specification, reference being had to the accompanying drawings, forming a part hereof.

In another application for Letters Patent of the United States, Ser. No. 570,320, filed July 5, 1910, there is shown and described a safety signal device for fluid pressure brake systems by which the engineer is enabled at any time, by testing, to determine whether the brake and signal system is in such condition as to permit the application of the brakes if necessary. As a testing means, the apparatus shown and described in said application is satisfactory, but the engineer must be depended upon to make the test and moreover, it might happen that such a change in the system might take place immediately after a test as would render the proper application of the brakes impossible.

It is, therefore, the object of this invention to provide means whereby the engineer, without test, shall be warned automatically of any such condition of the brake system, at any point in his train, as will render impossible a proper application of the brakes throughout the train, and also to provide means whereby it shall be impossible for the engineer to release the brakes unless the brake system and the signal system are in proper condition throughout the length of the train.

In accordance with the invention, there is provided on each car, preferably in connection with the usual angle cock, by which the train pipe may be closed, a device which will cause the brakes to be applied throughout the train if the angle cock, on any car of the train, should be turned, either accidentally or maliciously, to such a position as to close the train pipe, should the train be in motion, and to prevent the charging of the brake system with air under pressure so as to release the brakes, should any one of the angle cocks be turned to close the train pipe while the train is standing still, means being also provided whereby the angle cock at the rear end of the train may be closed, as is necessary, without interfering with the charging of the brake system and the release of the brakes. Means are also provided on each car whereby the signal system will be caused to indicate automatically to the engineer whenever there is, in any part of the train, a failure of pressure in the train pipe, means being also provided whereby this device must be set manually, by a train man, before the signal system can indicate to the engineer that the brake and signal system is in proper condition, while means are also provided to guard against the possible release of this automatic device by pressure in the signal pipe.

The invention will be more fully explained hereinafter with reference to the accompanying drawings in which it is illustrated, and in which—

Figure 1 is a view in elevation showing the devices which are carried upon the locomotive, a portion of which is indicated, and, in connection therewith, a single car equipment, parts being broken out to save space. Figs. 2, 3 and 4 are detail views, in section, showing one of the usual angle cocks, in connection with which the safety device first above referred to its applied. Figs. 5 and 6 are detail views, in section, showing a modification in the construction of the angle cock represented in Figs. 2, 3 and 4. Fig. 7 is a detail view, in section, of the second of the safety signal devices above mentioned which is applied to each car. Fig. 8 is a detail view, partly in elevation and partly broken out, illustrating a convenient application of the devices shown in Fig. 7 to a passenger car.

The improved safety devices may be employed in connection with any ordinary fluid pressure system for railway brakes, such as is indicated in Fig. 1 in which the engineer's valve $a$ is connected by a pipe $a'$ with a main reservoir, not necessary to be shown, and by a pipe $a^2$ with the train pipe $c$ through which the air pressure is admitted to the usual triple valve, auxiliary reservoir and brake cylinder, not shown. The train pipe $c$ on the locomotive is connected by the usual connections $c'$ with the train pipe $c^2$ on the car, each car being equipped and connected to the next in the same manner; the whistle signal pipe $d$ on the locomotive is also connected, as usual, to the main reservoir and by connections $d'$ with the signal pipe $d^2$ on the car. The signal pipe may be provided as usual with a reducing valve $e$ and a cut-out valve $e'$, in the connection between the main reservoir and the whistle signal pipe, and with an equalizing valve $e^2$ and the usual signal whistle $e^3$. Since a reducing valve between the train pipe and the signal pipe is provided on each car, as hereinafter explained, the reducing valve on the locomotive might be dispensed with, although it is preferably retained, as shown, for use with the ordinary equipment. On the train pipe $c^2$ of each car, at each end thereof, is placed the usual angle cock $c^3$; the signal pipe $d^2$ of each car being likewise provided at each end with a similar angle cock $d^3$. The angle cocks $c^3$ and $d^3$, at the rear end of the rear car of the train, are normally closed, while all other angle cocks, between the locomotive and the rear end of the train, are normally open to permit the free movement of the fluid under pressure.

The parts above referred to may be constructed and arranged in any usual or suitable manner, except that the first of the safety devices herein referred to is preferably combined directly with each angle cock $c^3$, as will now be described.

As shown, the plug $c^4$ of the angle cock $c^3$, as usually constructed, has a passage which, in the normal position of the angle cock, is in line with the bore of the body, as shown in Figs. 2 and 5, so as to afford a free passage for the fluid under pressure. Usually the angle cock has no other opening than its straight inlet and straight outlet, but in the improved construction it is provided with a vent $c^5$ which communicates with the atmosphere. When the angle cock is in normal position, the vent is closed, as shown in Figs. 2 and 5, but when the plug is in other than its normal position, that is, when the train pipe is obstructed by the plug, as is the case when a car is cut out of a train or may be the case, either through accidental or malicious movement of the valve, the train pipe is then directly vented to the atmosphere so that, if the train is running, the brakes shall be applied, or, if the train is standing still, the brake system cannot be charged with air to the pressure necessary to release the brakes. In the former instance, the engineer is notified by the setting of the brakes on a portion or even on the whole of the train that the train pipe system is not in proper condition, and in the other case he is unable to release the brakes until the defect in the system has been remedied. To this end the plug $c^4$ of the valve is provided with passages which place the train pipe in communication with the atmosphere through the vent $c^5$. In the arrangement shown in Figs. 2, 3 and 4, the plug is provided externally with milled passages $c^6$, $c^7$. When the angle cock is in normal position, neither of the passages $c^6$, $c^7$ communicates with the vent passage $c^5$, but as soon as the valve plug is turned slightly from its normal position the passage $c^6$ establishes communication between the train pipe and the vent, thereby permitting such decrease of pressure in the train pipe as will cause the application of the brakes not only on the car to which the particular angle cock is applied, but to the cars in front of and behind it. The passage $c^6$ has such length as to maintain communication between the train pipe of the car to which the angle cock is applied and the vent until the valve plug has been moved to a full quarter turn, while the passage $c^7$ may be shorter. The construction shown in Figs. 5 and 6 is the same as that shown in Figs. 2, 3 and 4, except that the passages $c^{6\times}$ and $c^{7\times}$ are formed by boring through the plug, as shown, instead of by being milled on the exterior surface of the plug. Obviously the operation is the same in both cases.

It has been assumed in the foregoing description that the vent $c^5$ is continuously open to the atmosphere. Such is the fact, in operation, as to all of the intermediate cars of the train, but obviously the rear end of the train pipe of the car at the rear end of the train must be closed by the angle cock and provision must be made for closing the vent of such angle cock. Accordingly, as clearly shown in Fig. 4, the extremity $c^8$ of the vent $c^5$ of such angle cock is closed by a valve $c^9$, which is held in its closed position by the air pressure on the rear face of the valve against the pressure of a spring $c^{10}$ which tends to hold the valve from its seat and therefore to keep the vent open. Obviously, when a car is detached and the pressure in the train pipe is lost, the valve $c^9$ will open automatically under the influence of the spring $c^{10}$, so that when the car is connected into the train the vent $c^5$ will be open and, so far as this device is concerned, the system will be in readiness for proper operation. It will also be obvious that if the car in question is connected on at the rear end of the train, the brake system cannot be charged with pressure to release the brakes until a train man, grasping the exposed end of the stem $c^{11}$ of the valve $c^9$ moves the valve from the open position, shown in Figs. 2 and 3, against the pressure of the spring $c^{10}$, to the closed position, shown in Fig. 4, in which it will then be held by the air pressure in the train pipe.

In order that the engineer may be warned automatically of any obstruction of the train pipe, in any part of the train, which might interfere with the proper application of the brakes behind it, it is necessary that there shall be a free passage of air from the locomotive, through the train pipe, to the rear end of the train and back, through the signal pipe, to the locomotive, so long as the entire system is in proper, operative condition, and so that, whenever any improper or dangerous condition exists, that fact shall be indicated to the engineer immediately by a signal in the cab, preferably by both an audible signal and a visual signal. There must, therefore, be provided a connection between the train pipe and the signal pipe which must be open on the rear car of the train and must be closed on every intermediate car. It is also necessary, for safety, that this connection shall close automatically and must be opened manually, at the rear end of the train, by a train man when the train has been made up, so that the engineer's signal will remain at danger until the entire brake system from the locomotive to the rear end of the train is in proper condition. Since the signal pipe in the improved arrangement receives its air from the train pipe through a reducing valve on the rear car, it will be obvious that any obstruction of the train pipe which prevents the supply of air to the signal pipe will be followed by a reduction of pressure in the signal pipe, which, in the usual and well known manner, will cause the whistle signal $e^3$ to be sounded. That the reduction of pressure in the signal pipe may also be indicated to the engineer by a visual alarm, there is also provided in the cab a pressure gage $e^4$ which is connected to the signal pipe in addition to the gage $m^9$ connected to the train pipe.

The connecting device $f$ between the train pipe and the signal pipe, on each car, is represented generally in Fig. 1, is shown applied to a car in a convenient position in Fig. 8, and is shown in detail in Fig. 7. For convenience the safety devices are incorporated in the same structure with the pressure reducing valve by which the train pipe pressure is reduced to the pressure which it is desired shall be admitted to the signal pipe. The device in its preferred form therefore comprises a pressure reducing valve, indicated in its entirety at $h$, a check valve to prevent release of the safety devices by pressure in the signal pipe, indicated in its entirety at $i$, and the safety device or devices, indicated in its or their entirety at $k$, the train pipe connection being indicated at $c^2$ in Fig. 7, and the signal pipe connection at $d^2$ in the same figure. The pressure reducing valve $h$ may be of ordinary construction, as indicated in the drawing, and need not be described in detail herein. The check valve $i$ is also of ordinary construction and need not be described in detail, operating in the usual manner to prevent the passage of air under pressure backward from the signal line $d^2$ to the safety devices between it and the train pipe. The safety devices comprise a check valve $k'$ which opens away from the train pipe toward the signal line. Its exposed area is small so that it may be held by the pressure of a light spring against a heavy train pipe pressure. The valve $k'$ is held normally to its seat by a piston plunger $k^2$ under the pressure of a suitably adjustable spring $k^3$. The cylinder $k^4$, in which the piston plunger $k^2$ moves, is provided with a leakage groove $k^5$ and with a vent $k^6$, so that when the piston plunger is in the position shown in Fig. 7 any air which may leak past the valves $i$ and $k'$ may escape to the atmosphere. The valve $k'$ is preferably independent of the piston plunger as indicated so that it may set itself properly and may move independently of the plunger. The stem of the plunger $k^2$ is provided with a suitable handle $k^7$, outside of the casing, so that the train man, grasping the same, may pull the piston $k^2$ backward against the pressure of the spring $k^3$, until it passes the leakage groove $k^5$, thereby permitting the air from the train pipe to unseat the valve $k'$ and then the valve $i$ and so to pass into the signal pipe through the reducing valve $h$. Obviously, when the piston plunger $k^2$ has been pulled back in this manner beyond the leakage groove $k^5$, it will be held in such position by the pressure of air from the train pipe against the large exposed area of the piston plunger $k^2$, a passage $k^8$ being formed so as to permit the air from the train pipe to enter the cylinder $k^4$. It will now be seen that whenever a car has been cut out of a train and the pressure in the train pipe has fallen, the spring $k^3$ will hold the piston plunger against the valve $k^8$ and the latter to its seat, thus preventing free movement of air from the train pipe to the signal line. Moreover, when the car is connected into a train, the check valve $k'$ will still be held to its seat by the spring $k^3$ against the train pipe pressure until the piston is pulled back by the train man. Furthermore, even if it should happen that there is pressure in the signal line and no pressure in the train pipe, as might be the case with the old equipment, the check valve $i$ will prevent the excess of signal line pressure to the piston plunger $k^2$, so that the check valve $k'$ cannot, by the signal line pressure, be relieved of the pressure of the spring $k^3$ which holds it normally on its seat. Thus, whenever a car is cut into a train, the valve $k'$ will be closed automatically, without the attention of a train man, and the train man's attention, therefore, need be given only to the safety device $k$ at the rear end of the train. Again, until the train man has opened the valve $k'$ at the rear end of the train no air will be admitted from the train pipe to the signal line, and consequently the signal device in the cab will show to the engineer that the system is not in proper condition.

It will be understood that although the several safety devices herein shown and described are preferably employed together in order that the system may be made safe against any dangerous or improper condition likely to arise, nevertheless, each is capable of use independently of the other and when so used realizes to the full its own peculiar advantages. It will also be obvious that changes in details of construction and arrangement may be made to suit different conditions of use. The invention, therefore, is not limited either to the use of all of the safety devices in the same system nor to the precise construction and arrangement shown and described herein.

The means for venting the train pipe when an angle cock is closed which are shown and described in detail herein, and the means for indicating to the engineer a reduction of pressure in the train pipe, which are shown generally herein, are not of themselves claimed herein, the former being claimed generally only in so far as they form a part of the general system and the latter not being included in any of the claims, the construction of these devices, so far as they may be patentable, being reserved for other applications.

I claim as my invention:

1. In a fluid pressure brake system, the combination of a train pipe, a signal pipe, a cab signal, and a safety signal device connected between the train pipe and the signal pipe remote from the cab, said safety signal device closing the connection between the train pipe and the signal pipe and adapted to be opened by hand and to be held open by train pipe pressure.

2. In a fluid pressure brake system, the combination of a train pipe, a signal pipe, a cab signal, and a safety signal device comprising a check valve opening from the train pipe to the signal pipe, and a spring-pressed plunger holding the check valve to its seat and movable by hand to release the check valve and adapted to be held in open position by the train pipe pressure.

3. In a fluid pressure brake system, the combination of a train pipe, a signal pipe, a cab signal, and a safety signal device comprising a check valve opening from the train pipe to the signal pipe, and a spring-pressed piston plunger movable by hand to release the check valve and subject to the pressure from the train pipe when the check valve is open to be thereby held in open position.

4. In a fluid pressure brake system, the combination of a train pipe, a signal pipe, a cab signal, and a safety signal device comprising a check valve opening from the train pipe to the signal pipe, a spring-pressed piston plunger holding the check valve to its seat and adapted to be held by train pipe pressure in its open position when opened by hand, and a second check valve interposed between the piston plunger and the signal pipe whereby pressure in the signal pipe is prevented from acting upon the piston plunger.

5. In a fluid pressure brake system, the combination of an air circuit from the engine cab to the rear end of the train and forward to the cab, including a train pipe and a signal pipe, a cab signal connected to the signal pipe and operated by a reduction of pressure in the signal pipe, a connection on each car between the train pipe and the signal pipe, means operated by a reduction of pressure to close the connection on each car, and manually operated means to maintain the connection on the rear car open.

6. In a fluid pressure brake system, the combination of an air circuit from the engine cab to the rear end of the train and forward to the cab, including a train pipe and a signal pipe, a cab signal connected to the signal pipe and operated by a reduction of pressure in the signal pipe, a connection on each car between the train pipe and the signal pipe, means to close the connection on each car, means to maintain the connection on the rear car open, means on each car to close the signal pipe, and means on each car to vent the signal pipe when the signal pipe is closed by said means on any car.

7. In a fluid pressure brake system, the combination of an air circuit from the engine cab to the rear end of the train and forward to the cab, including a train pipe and a signal pipe, a cab signal connected to the signal pipe and operated by a reduction of pressure in the signal pipe, means on each car to close the signal pipe, means on each car to vent the signal pipe when the signal pipe is closed by said first named means on any car, and means to prevent the venting of the signal pipe by the closing of said first named means on the rear car.

8. In a fluid pressure brake system, the combination of an air circuit from the engine cab to the rear end of the train and forward to the cab, including a train pipe and a signal pipe, a cab signal connected to the signal pipe and operated by a reduction of pressure in the signal pipe, and a safety signal device connected between the train pipe and the signal pipe remote from the cab, said safety signal device normally closing the connection between the train pipe and the signal pipe and adapted to be opened by hand and to be held open by train pipe pressure.

This specification signed and witnessed this 24th day of September, A. D., 1910.

WILLIAM H. SAUVAGE.

Signed in the presence of—
ELLA J. KRUGER,
HELEN M. DAMES.

Copies of this patent may be obtained for five cents each, by addressing the "Commissioner of Patents, Washington, D. C."